US009300151B2

(12) United States Patent  
Chen et al.

(10) Patent No.: US 9,300,151 B2
(45) Date of Patent: Mar. 29, 2016

(54) WIRELESS CHARGING DEVICE

(71) Applicants: Shih Chung Chen, Hsin Chuang (TW); Shu-Mu Chen, Hsin Chuang (TW)

(72) Inventors: Shih Chung Chen, Hsin Chuang (TW); Shu-Mu Chen, Hsin Chuang (TW)

(73) Assignee: Youhua Technology (Shenzhen) Co., LTD., Shenzhen (CN)

( * ) Notice: Subject to any disclaimer, the term of this patent is extended or adjusted under 35 U.S.C. 154(b) by 205 days.

(21) Appl. No.: 14/188,770

(22) Filed: Feb. 25, 2014

(65) Prior Publication Data

US 2015/0244195 A1    Aug. 27, 2015

(51) Int. Cl.
*H02J 7/00* (2006.01)
*H02J 7/02* (2006.01)
*H02J 17/00* (2006.01)

(52) U.S. Cl.
CPC ............. *H02J 7/0044* (2013.01); *H02J 7/0045* (2013.01); *H02J 7/0052* (2013.01); *H02J 7/025* (2013.01); *H02J 17/00* (2013.01)

(58) Field of Classification Search
None
See application file for complete search history.

(56) References Cited

U.S. PATENT DOCUMENTS

| | | | | |
|---|---|---|---|---|
| 5,550,452 A * | 8/1996 | Shirai | ..................... | H02J 7/025 320/108 |
| 6,265,789 B1 * | 7/2001 | Honda | ..................... | H01F 38/14 307/106 |
| 8,242,741 B2 * | 8/2012 | Phelps, III | ............. | H02J 7/025 320/107 |
| 8,624,547 B2 * | 1/2014 | Thorsell | ................ | B60N 3/002 320/107 |
| 8,624,750 B2 * | 1/2014 | Azancot | .................. | H02J 5/005 340/657 |
| 9,148,033 B2 * | 9/2015 | Van Wiemeersch | .. | H02J 7/0044 |
| 2009/0152428 A1 * | 6/2009 | Cilia | ...................... | B60R 11/02 248/346.03 |
| 2013/0088193 A1 * | 4/2013 | Chen | ....................... | H02J 7/025 320/108 |
| 2013/0154555 A1 * | 6/2013 | Miller | .................... | H02J 7/0042 320/108 |
| 2013/0307470 A1 * | 11/2013 | Watanabe | ............... | H02J 7/025 320/108 |
| 2015/0069961 A1 * | 3/2015 | Chen | ....................... | H02J 7/025 320/108 |

FOREIGN PATENT DOCUMENTS

TW          102132220    *   9/2013    ............. H02J 7/025

* cited by examiner

*Primary Examiner* — Leigh Garbowski

(74) *Attorney, Agent, or Firm* — Garcia-Zamor IP Law; Ruy M. Garcia-Zamor

(57) ABSTRACT

A wireless charging device of the disclosure is used for carrying out wireless battery charging for an electronic device. The wireless charging device includes a wireless charger, a positioning seat, and an adjusting seat. The positioning seat is fixed with the wireless charger. The positioning seat and the wireless charger collectively form a sliding space. The adjusting seat supports the electronic device. The adjusting seat extends into the sliding space and slides along the sliding space relatively to the positioning seat, to adjust a location of a transmitter coil center of the wireless charger, which results that the transmitter coil center of the transmitter of the wireless charger aligns to a receptor coil center of the electronic device.

19 Claims, 17 Drawing Sheets

WIRELESS CHARGING DEVICE

BACKGROUND

1. Technical Field

The present disclosure generally relates to wireless charging technology field, and especially to a wireless charging device.

2. Description of Related Art

Nowadays, most of the portable electronic devices, such as smart phones, tablet computers, carry out battery charging for the electronic devices by connection between data cables and chargers. As a result, when consumers go out, the consumers must carry on the chargers and data cables to prevent the battery capacity of the electronic device from being used up, which results inconvenience for the consumers.

With the rapid development of science and technology, wireless chargers employing wireless charging technology rise in response to the proper time and conditions. Because it is not necessary for the wireless chargers to use traditional data cables to connect to the electronic devices, when the consumers go out, the number of different kinds of chargers and date cables that the consumers need take is reduced greatly, which results of convenience and universality for the consumers.

A wireless charger is a charging equipment with employment of the electromagnetic induction principle, which is similar with transformers. The wireless charger includes a transmitter coil, and the electronic device includes a receptor coil. The transmitter coil connects power supply to generate electromagnetic signals. The receptor coil induces the electromagnetic signals from the transmitter coil to generate electricity for charging the battery of the electronic device.

Based on existing wireless charging technology, in order to convert the electromagnetic signals to electrical energy efficiently, the receptor coil center need align the transmitter coil center. The receptor coil center of the electronic device is generally the center position of the electronic device. However, different electronic devices have different size from each other. So that, distances between edges and centers of different electronic devices varies correspondingly. As a result, how to adjust a location of the transmitter coil center of the wireless charger to align the receptor coil center of different electronic devices, so as to use one wireless charger to carry out battery charging different electronic devices with different sizes efficiently, has become a major issue for the wireless charging device designers.

SUMMARY

The purpose of the disclosure is to offer a wireless charging device capable of adjusting a location of a transmitter coil center of a wireless charger to align a receptor coil center of different electronic devices with different sizes, so as to meet wireless battery charging requirements for most electronic devices.

The wireless charging device of the disclosure is used for carrying out wireless battery charging for electronic devices. The wireless charging device includes a wireless charger, a positioning seat, and an adjusting seat. The positioning seat is fixed with the wireless charger. The positioning seat and the wireless charger collectively form a sliding space. The adjusting seat supports the electronic device. The adjusting seat extends into the sliding space and slides along the sliding space relatively to the positioning seat, to adjust a location of a transmitter coil center of the wireless charger, which results that the transmitter coil center of the transmitter of the wireless charger aligns to a receptor coil center of the electronic device.

Preferably, the wireless charger includes at least one first latching portion and at least one second latching portion, the positioning seat includes a first positioning board, at least one first hook, and at least one second hook, the first hook and the second hook project from the first positioning board. The sliding space is formed between the first positioning board and the wireless charger, the first hook engages with the first latching portion, and the second hook engages with the second latching portion to fix the wireless charger with the positioning seat.

Preferably, the first latching portion defines a guiding slot, and includes a first latching block extending from one side of the guiding slot, a stopping space is formed between the first latching block and a bottom of the guiding slot. The first hook includes a second latching block projecting from the first positioning board and a stopping block extending from the second latching block and parallel with the first positioning board. The first hook extends into the guiding slot and slides along the guiding slot, the stopping block slides into the stopping space and stops at the first latching block, and the first latching block and the second latching block mesh with each other to fix the wireless charger with the first positioning board.

Preferably, the first latching portion and the second latching portion are axisymmetric.

Preferably, the adjusting seat includes a supporting board supporting the electronic device, and an adjusting board connected with the supporting board. the adjusting board extends into the sliding space and slides in the sliding space to adjust the location of the transmitter coil center of the wireless charger.

Preferably, the supporting board includes a first supporting portion supporting the electronic device, and a slanting portion extending from one side of the first supporting portion slantly. The adjusting board extends from the slanting portion and parallel with the wireless charger. A bottom of the wireless charger contacts the slanting portion.

Preferably, the supporting board further includes a second supporting portion and a third supporting portion, the second supporting portion extends from one side of the slanting portion, the third supporting portion extends from another side of the first supporting portion and toward the second supporting portion. The second supporting portion and the third supporting portion collectively support the wireless charger.

Preferably, the positioning seat further includes a pair of ribs extending from two sides of the first positioning board, respectively, the first hook and the second hook project from the pair of ribs, respectively. The pair of ribs resist the wireless charger. The pair of ribs, the first positioning board, and the wireless charger collectively form the sliding space.

Preferably, the adjusting board defines a plurality of positioning slots, a latching strip projects from one side of the first positioning board toward the sliding space, and wherein the latching strip engages with one of the positioning slots to adjust a location of the wireless charger relative to the supporting board.

Preferably, the positioning seat further includes an operating strip, a pair of gaps are defined between the two side of the operating strip and the first positioning board. The operating strip includes a operating portion, the latching strip and the operating portion are located at two sides of the operating strip, respectively.

Preferably, the adjusting board defines a sliding groove, the wireless charging device further includes a sliding block fixed with the first positioning board. The sliding block slides along the sliding groove to adjust the location of the transmitter coil center of the wireless charger.

Preferably, the positioning seat further includes a second positioning board, two sides of the second positioning board connect with two sides of the first positioning board, respectively to collectively form a sliding slot. The wireless charging device further includes a first clamping board and a second clamping board, one end of the first clamping board inserts into the sliding slot from one end of the sliding slot, and one end of the second clamping board inserts into the sliding slot from another end of the sliding slot. The first clamping board and the second clamping board slide along the sliding slot, respectively, to adjust distance between another ends of the first clamping board and the second clamping board. The electronic device are clamped between the other ends of the first clamping board and the second clamping board.

Preferably, the sliding slot includes a first child sliding slot and a second child sliding slot parallel to the first child sliding slot. The first clamping board includes a first clamping portion, a first sliding strip and a second sliding strip. The first and second sliding strips extend from the first clamping portion and slide in the first child sliding slot and the second child sliding slot, respectively, the first clamping portion exposes out of the sliding slot.

Preferably, the second sliding strip defines a plurality of first recesses, the second positioning board defines a first latching slot in communication with the second child sliding slot. The wireless charging device further includes a first positioning block, the first positioning block is positioned at the first latching slot with one end of the first positioning block extending into the second child sliding slot to engage with one of the first recesses to adjust a distance between the first clamping portion of the first clamping board and the first positioning board.

Preferably, the second clamping board includes a second clamping portion, a third sliding strip, and a fourth sliding strip, the third and fourth sliding strips extend from the second clamping portion, and slides in the first child sliding slot and the second child sliding slot, respectively. The second clamping board exposes out of the sliding slot.

Preferably, the third sliding strip defines a plurality of second recesses, the second positioning board defines a second latching slot in communication with the first child sliding slot. The wireless charging device further includes a second positioning block, the second positioning block is positioned at the second latching slot with one end of the second positioning block extending into the first child sliding slot to engage with one of the second recesses to adjust a distance between the second clamping portion of the second clamping board and the first positioning board.

Preferably, the positioning seat further includes a plurality of clamping sheets projecting from the second positioning board, and a sleeve projecting from the second positioning board. The clamping sheets forms a shape of a circle, and the sleeve surrounds the clamping sheets. The wireless charging device further includes a supporting mechanism, and one end of the supporting mechanism extends into the clamping sheets and fixes with the second positioning board by engagement between a fixing part and the sleeve.

Preferably, the supporting mechanism includes a spherical joint extends into the clamping sheets and stops at the fixing part, the spherical joint latches with the second positioning board with rotation of the fixing part.

Preferably, the supporting mechanism includes a connecting board, a pair of supporting arms, and a pair of latching arms. The spherical joint projects from one side of the connecting board, the pair of supporting arms respectively extends from the connecting board and locate symmetrically at two ends of the connecting board, and the pair of latching arms respectively parallel extends from another side of the connecting board.

Preferably, the supporting mechanism is a sucker.

It follows that, the positioning seat of the disclosure is configured for fixing the standard wireless charger, and the adjusting seat is configured for adjusting the location of the transmitter coil center of the wireless charger to result the transmitter coil center of the wireless charger to align the receptor coil center of the electronic device, which results of great improvement of wireless battery charging efficiency for the electronic device.

In addition, the wireless charging device of the disclosure is capable of carrying out wireless battery charging for different electronic devices with different sizes, and meet wireless battery charging requirements for most electronic devices. So that, a number of the wireless charger is reduced greatly, which results of convenience for the consumers.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
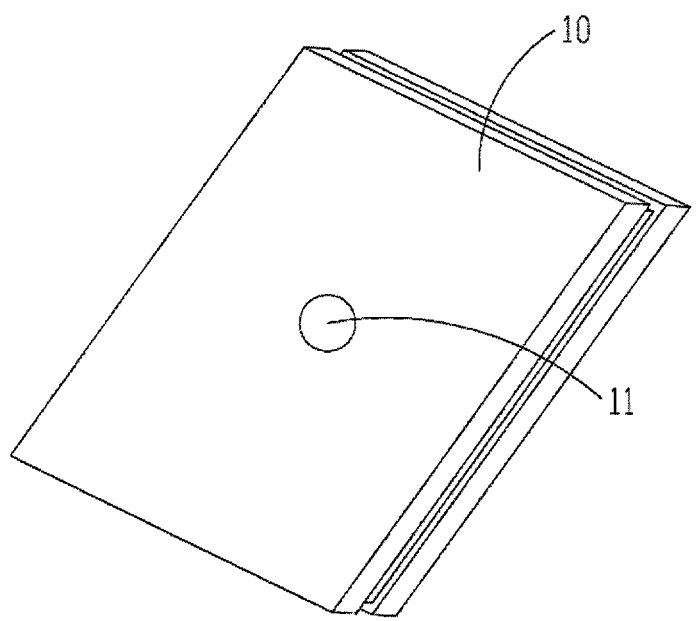
FIG. 1 is an assembled view of a wireless charger of the disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

With reference to FIGS. 1-17, the wireless charging device 100 is used for carrying out wireless battery charging for an electronic device. The wireless charging device 100 includes a wireless charger 10, a positioning seat 20, and an adjusting seat 30. The wireless charger 10 is fixed with the positioning seat 20. The wireless charger 10 and the positioning seat 20 collectively form a sliding space 40. The adjusting seat 30 supports the electronic device, and extends into the sliding space 40. The adjusting seat 30 slides in the sliding space 40 relatively to the positioning seat 20 to adjust a location of a transmitter coil center 11 of the wireless charger 10, which results that the transmitter coil center 11 of the wireless charger 10 aligns to a receptor coil center of the electronic device.

In the embodiment, the receptor coil center of the electronic device is the center position of the electronic device.

It follows that, the positioning seat 20 of the disclosure is configured for fixing the standard wireless charger 10, and the adjusting seat 30 is configured for adjusting the location of the transmitter coil center 11 of the wireless charger 10 to make the transmitter coil center 11 of the wireless charger 10 to align the receptor coil center of the electronic device, which results of great improvement of wireless battery charging efficiency for the electronic device.

In addition, the wireless charging device 100 of the disclosure is capable of carrying out wireless battery charging for different electronic devices with different sizes, and meet wireless battery charging requirements for most electronic devices. So that, a number of the wireless charger 10 is reduced greatly, which results of convenience for the consumers.

With reference to FIG. 1, the wireless charger 10 is a standard wireless charger, and any electronic devices conforming to the standard principles of wireless charging can carry out wireless battery charging by the wireless charging charger 10.

Figure 2:
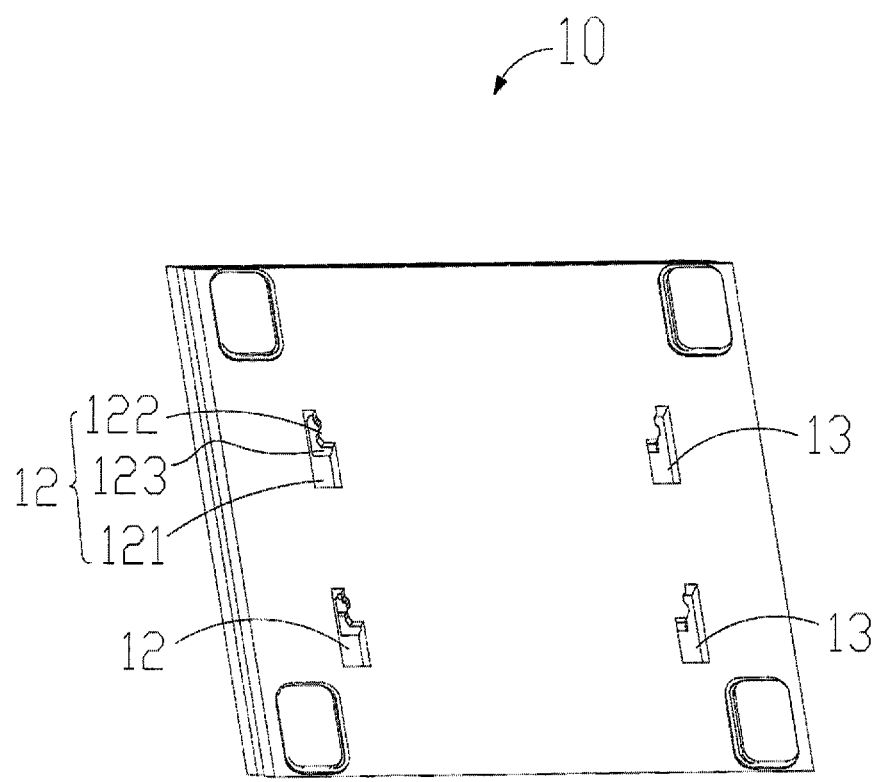
FIG. 2 is same as FIG. 1, but viewed from another view.
Figure 3:
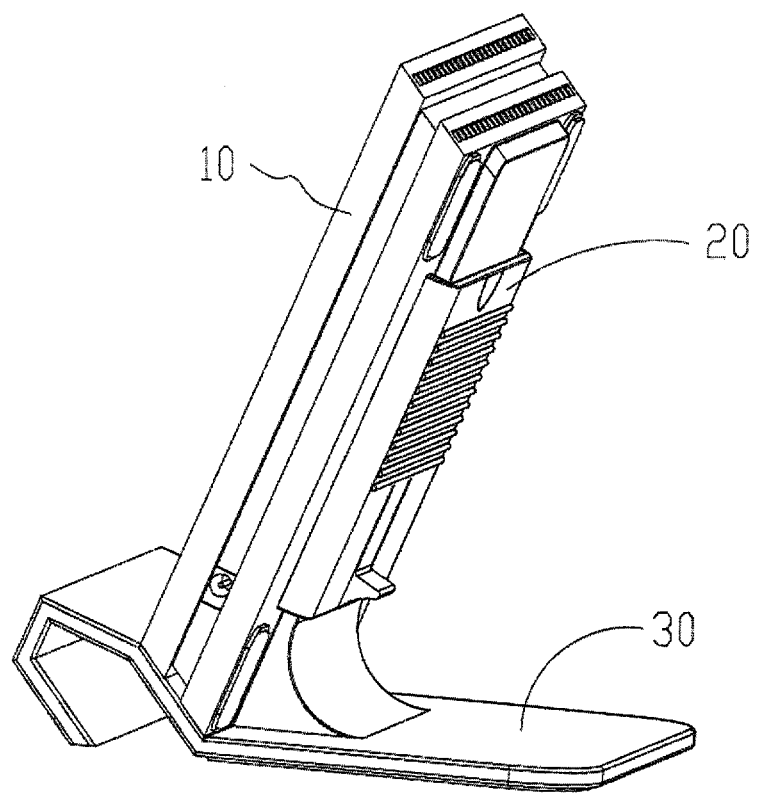
FIG. 3 is an assembled view of a wireless charging device according to a first exemplary embodiment of the disclosure.
Figure 5:
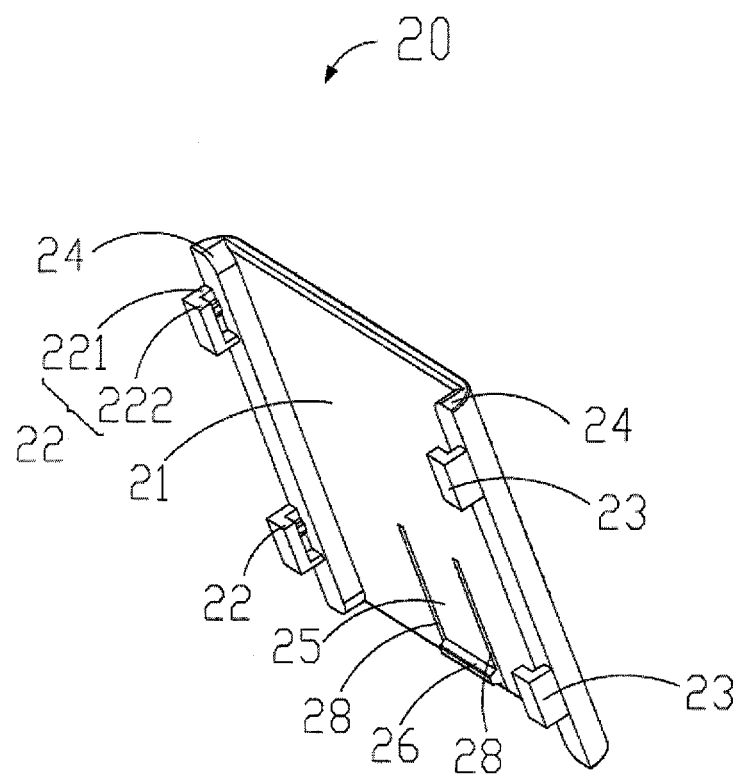
FIG. 5 is a perspective view of a positioning base of FIG. 4.
Figure 6:
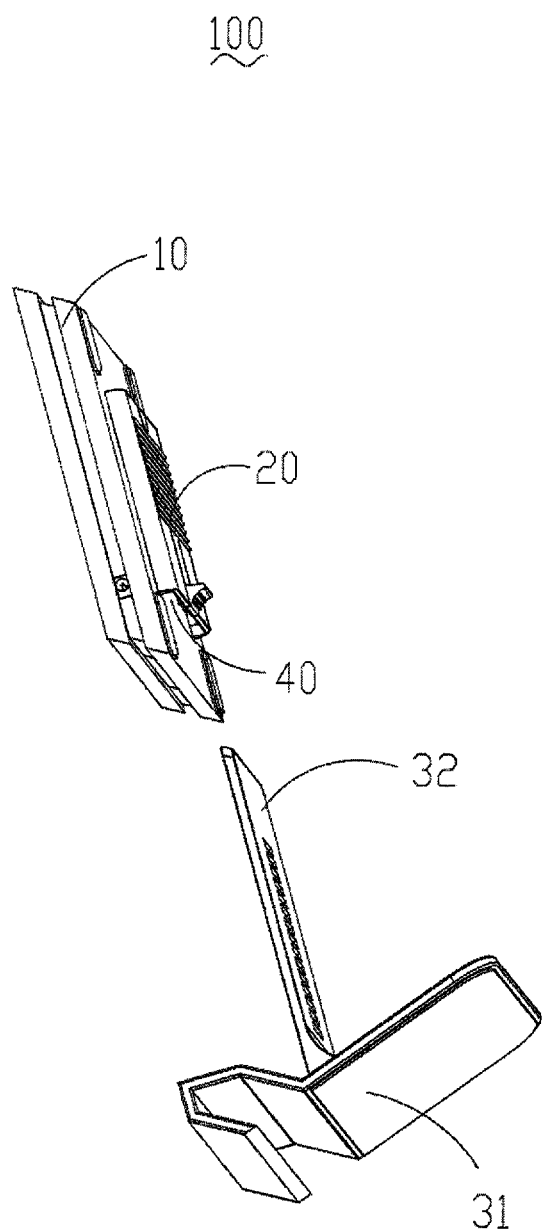
FIG. 6 is a partial exploded view of the wireless charging device of FIG. 3, wherein the positioning seat is mounted on the wireless charger.
Figure 7:
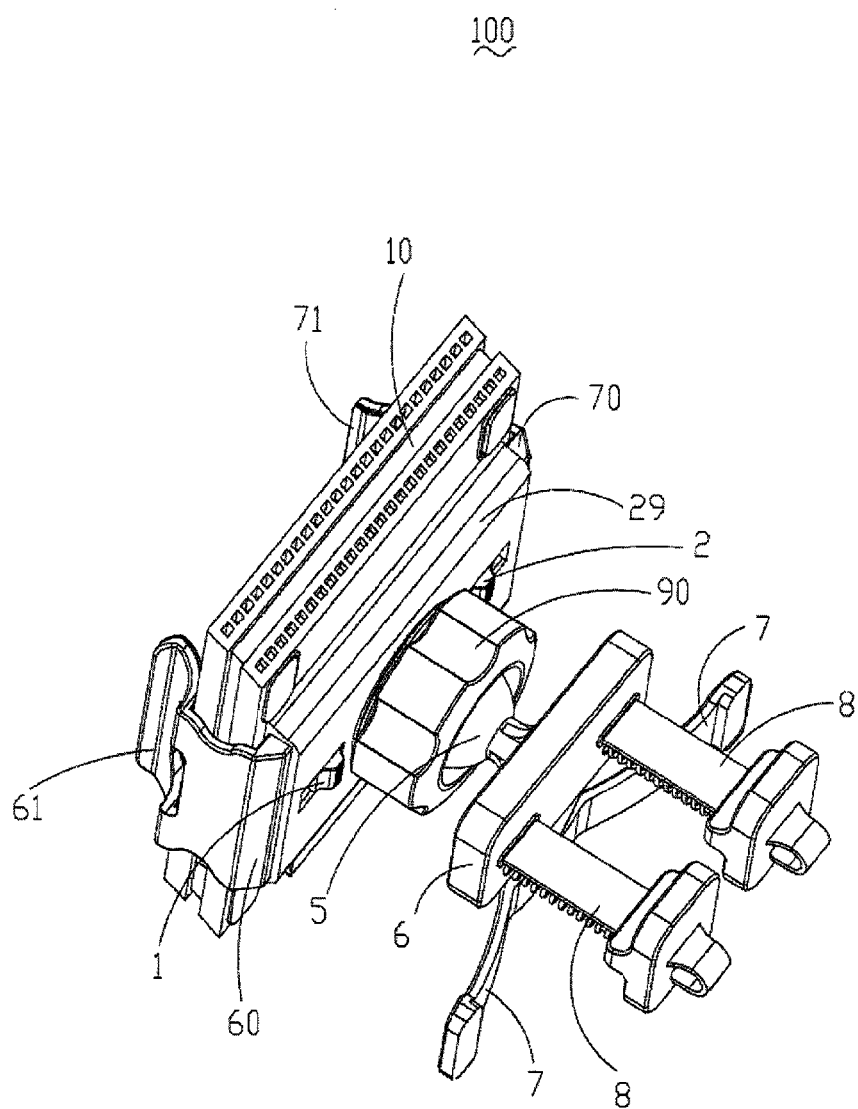
FIG. 7 is an assembled view of the wireless charging device according to a second exemplary embodiment of the disclosure.
Figure 8:
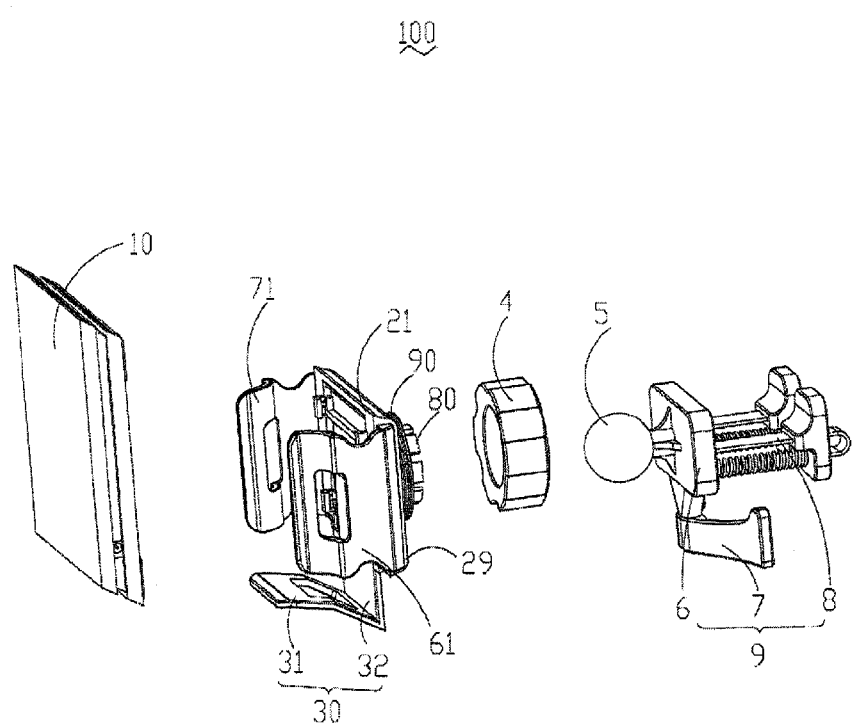
FIG. 8 is a partial exploded view of the wireless charging device of FIG. 7.
Figure 9:
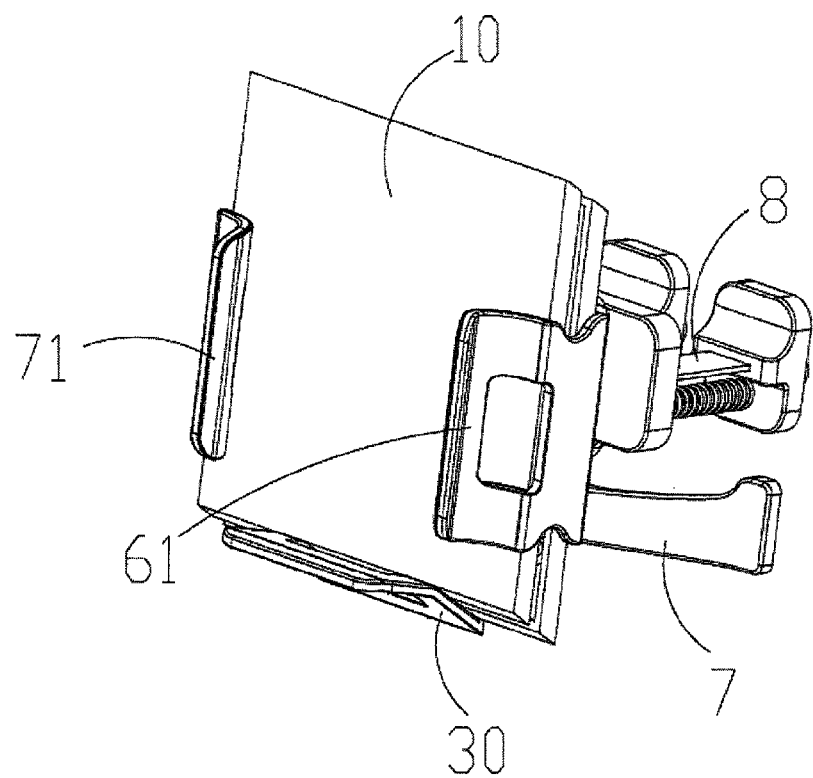
FIG. 9 is same as FIG. 7, but view from another view.
Figure 10:
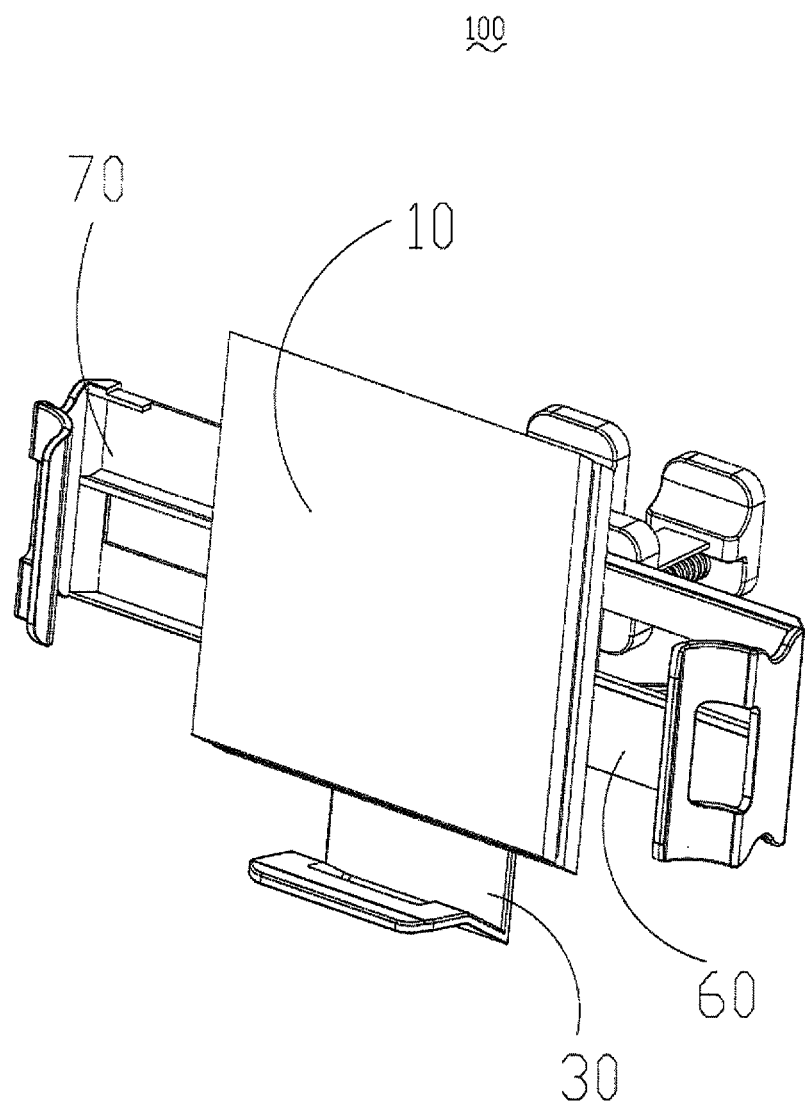
FIG. 10 is same as FIG. 7, wherein a first clamping board, a second clamping board and a adjusting board are stretched relative to the positioning seat.
Figure 11:
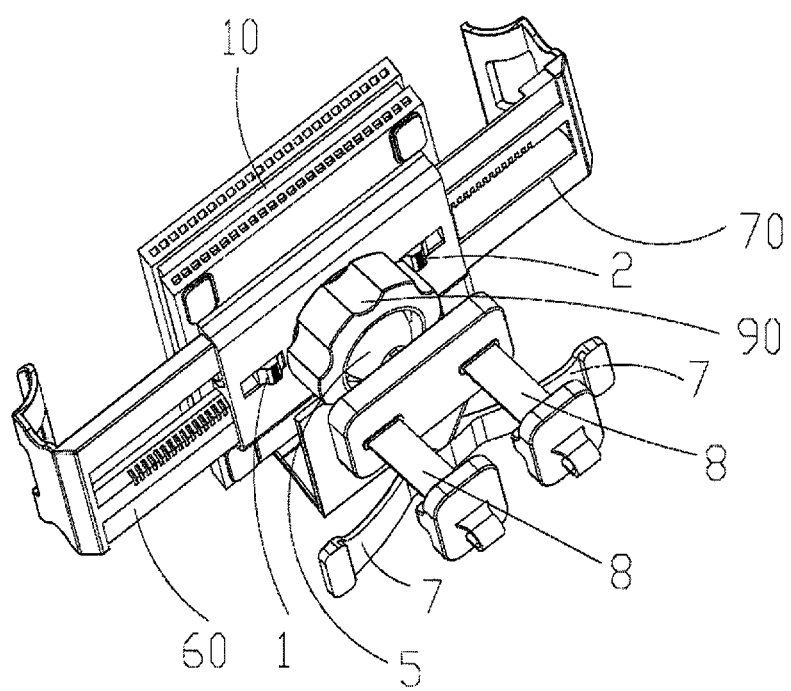
FIG. 11 is same as FIG. 10, but viewed from another view.
Figure 12:
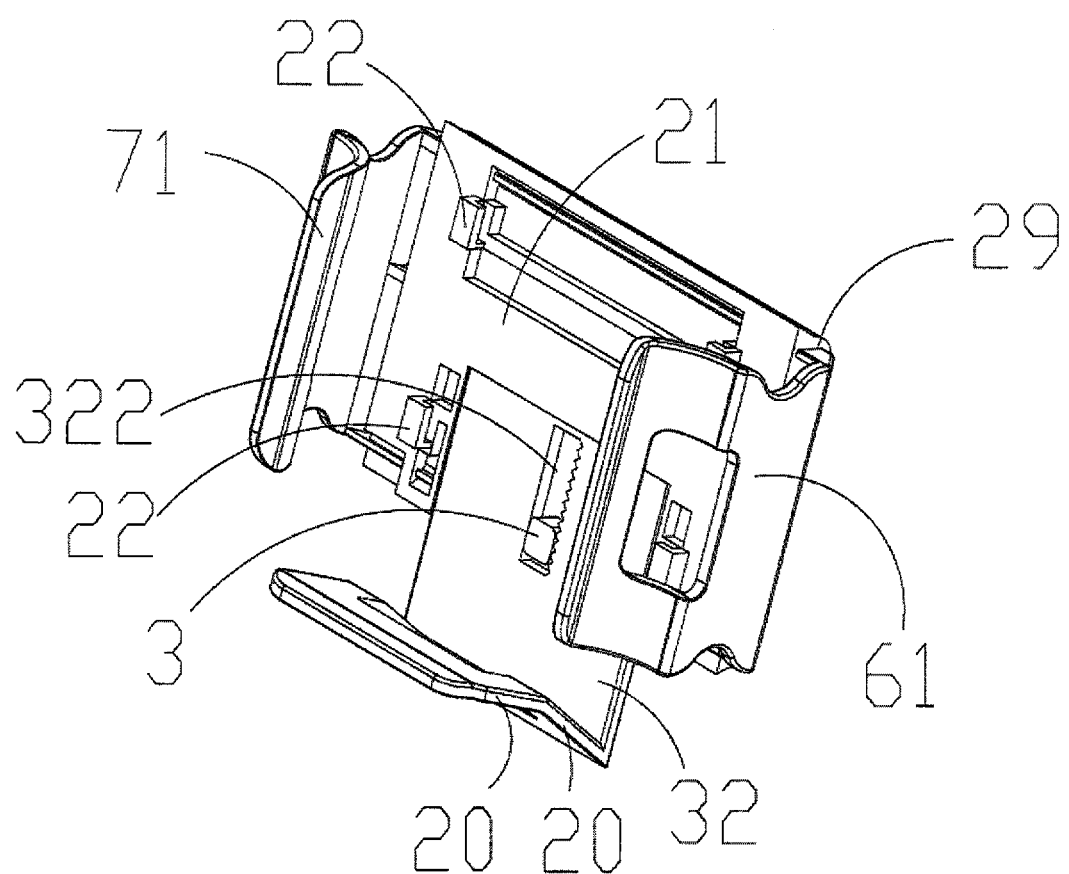
FIG. 12 is an assembled view of the first clamping board, the second clamping board, the adjusting board and the positioning seat of the wireless charging device of FIG. 8.
Figure 13:
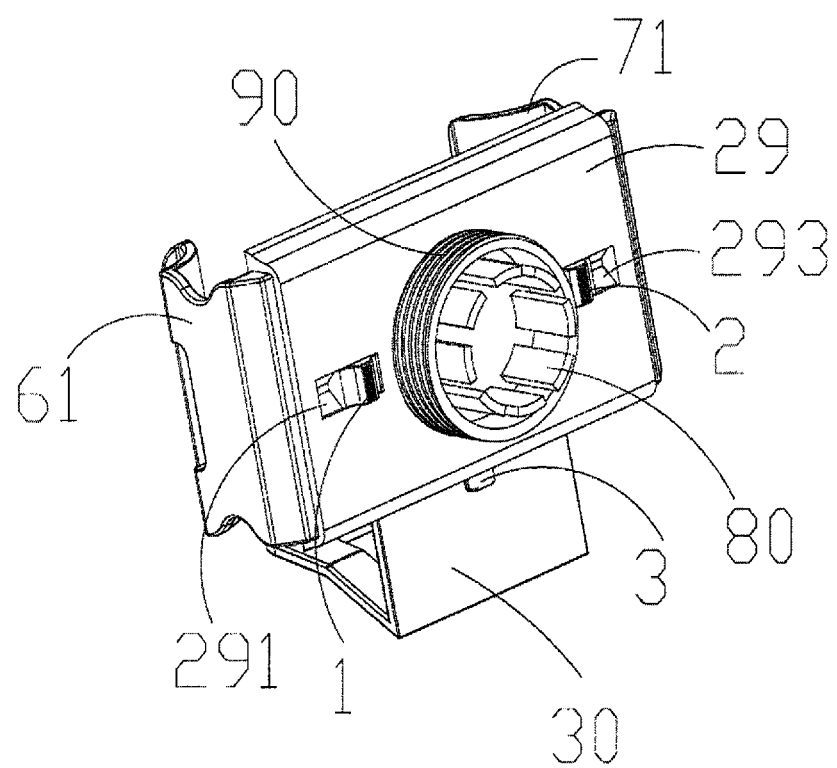
FIG. 13 is same as FIG. 12, but viewed from another view.
Figure 14:
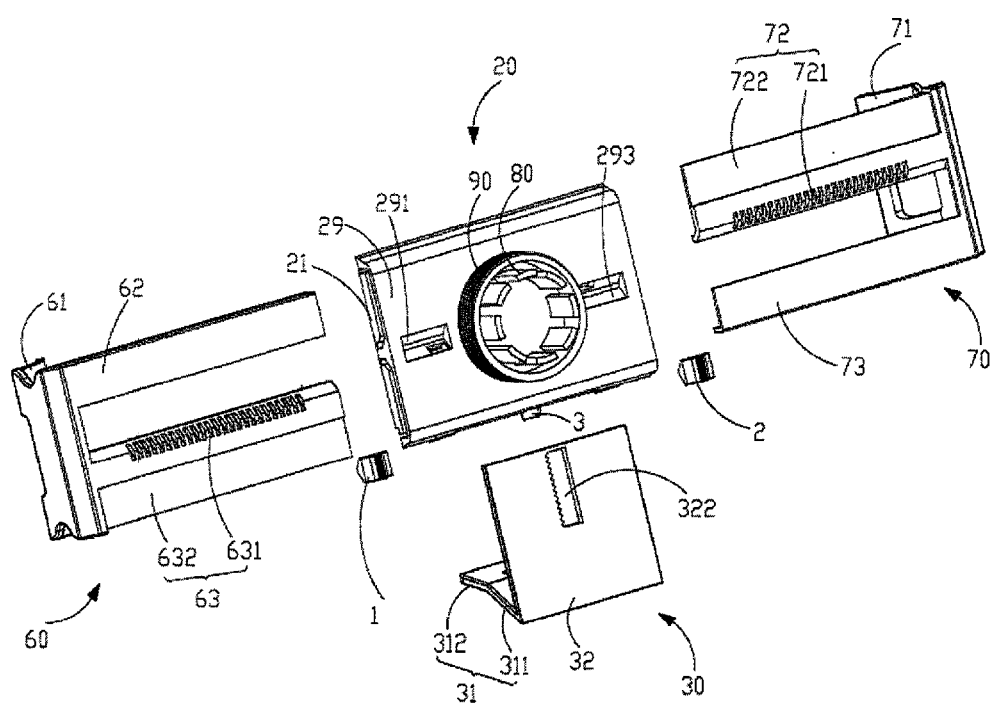
FIG. 14 is an exploded view of FIG. 12.
Figure 15:
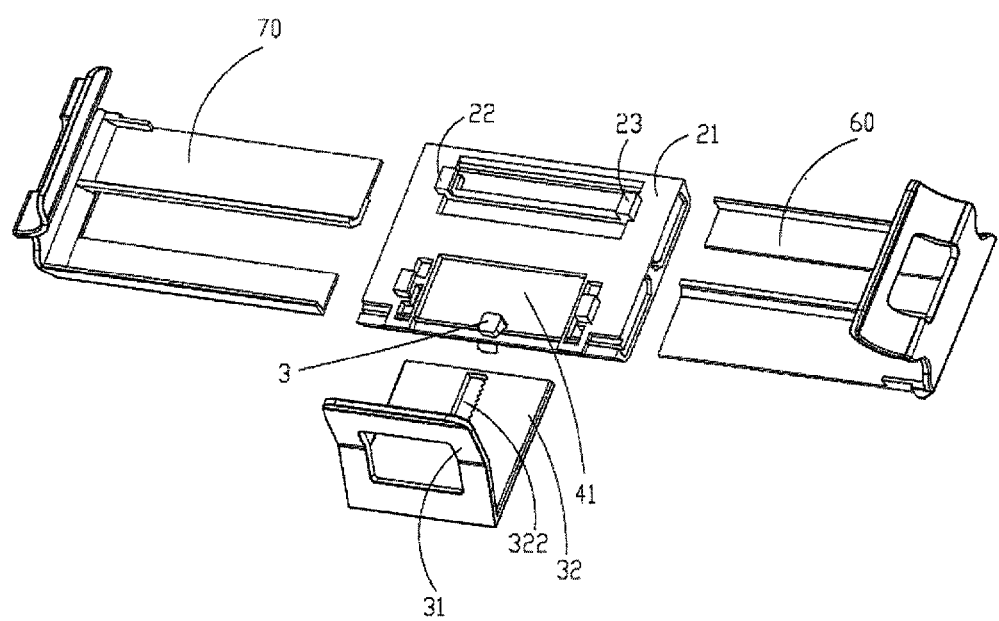
FIG. 15 is same as FIG. 14, but viewed from another view.

With reference to FIG. 2 and FIG. 5, the wireless charger 10 includes at least one first latching portion 12 and at least one second latching portion 13. The positioning seat 20 includes a first positioning board 21, at least one first hook 22, and at least one second hook 23. The first hook 22 and the second hook 23 respectively project from the first positioning board 21. In assembly, the first hook 22 engages with the first latching portion 12, the second hook 23 engages with the second latching portion 13 to fix the wireless charger 10 with the positioning seat 20.

In the embodiment, the first latching portion 12 and the second latching portion 13 are axisymmetric. The wireless charger 10 includes a pair of first latching portions 12, and a pair of second latching portions 13. Accordingly, the positioning seat 20 includes a pair of first hooks 22 and a pair of second hooks 23, and the first hooks 22 and the second hooks 23 are axisymmetric correspondingly.

In detail, the first latching portion 12 defines a guiding slot 121, and includes a first latching block 122 extending from one side of the guiding slot 121. A stopping space 123 is formed between the first latching block 122 and a bottom of the guiding slot 121. The first hook 22 includes a second latching block 221 projecting from the first positioning board 21 and a stopping block 222 extending from the second latching block 221 and parallel with the first positioning board 21. In assembly, the first hook 22 extends into the guiding slot 121 and slides along the guiding slot 121. The stopping block 222 slides into the stopping space 123 and stops at the first latching block 122. The first latching block 122 and the second latching block 221 mesh with each other to fix the wireless charger 10 with the first positioning board 20. As a result, a sliding space 40 is formed between the first positioning board 21 and the wireless charger 10, shown as FIG. 6.

The adjusting seat 30 includes a supporting board 31 supporting the electronic device, and an adjusting board 32 connected with the supporting board 31. The adjusting board 32 extends into the sliding space 40 and slides in the sliding space 40 to adjust the location of the transmitter coil center 11 of the wireless charger 10.

The supporting board 31 includes a first supporting portion 311 supporting the electronic device, and a slanting portion 312 extending from one side of the first supporting portion 311 slantly. The adjusting board 32 extends from the slanting portion 312 and parallel with the wireless charger 10. In assembly, a bottom of the wireless charger 10 contacts the slanting portion 312.

FIGS. 3-6 show the wireless charging device 100 according to a first exemplary embodiment of the disclosure, the wireless charging device 100 is used in the room. In the embodiment, the wireless charger 10 stands. The supporting board 31 further includes a second supporting portion 313 and a third supporting portion 314. The second supporting portion 313 extends from one side of the slanting portion 312. The adjusting board 32 projects from the second supporting portion 313. The third supporting portion 314 extends from another side of the first supporting portion 311 and toward the second supporting portion 313. The second supporting portion 313 and the third supporting portion 314 collectively support the wireless charger 10.

With reference to FIG. 5, in the first embodiment, the positioning seat 20 further includes a pair of ribs 24 extending from two sides of the first positioning board 21, respectively. The first hook 22 and the second hook 23 project from the pair of ribs 24, respectively. In assembly, the pair of ribs 24 resist the wireless charger 10. As a result, the pair of ribs 24, the first positioning board 21, and the wireless charger 10 collectively form the sliding space 40.

The adjusting board 32 defines a plurality of positioning slots 321. A latching strip 26 projects from one side of the first positioning board 21 toward the sliding space 40. In assembly, the latching strip 26 engages with one of the positioning slots 321 to adjust the location of the transmitter coil center 11 of the wireless charger 10 relative to the supporting board 31.

In use, the electronic device is positioned on the first supporting portion 311 with the back of the electronic device against the wireless charger 10, and the center position of the electronic device and the transmitter coil center of the wireless charger 10 being in the same line. The latching strip 26 on the first positioning board 21 escapes from the positioning slot 321. The wireless charger 10 slides together with the positioning seat 20 relatively to adjusting board 32 to result the transmitter coil center 11 of the wireless charger 10 to align the center position of the electronic device. Subsequently, the latching strip 26 is latched into a corresponding positioning slot 321 to fix the wireless charger 10 with the adjusting board 32. That is, the transmitter coil center 11 of the wireless charger 10 can align the center positions of different electronic devices with different sizes by employment of the wireless charging device 100 of the first embodiment, to result high efficiency of wireless battery charging for the electronic devices, which meets requirements of the consumers.

Figure 4:
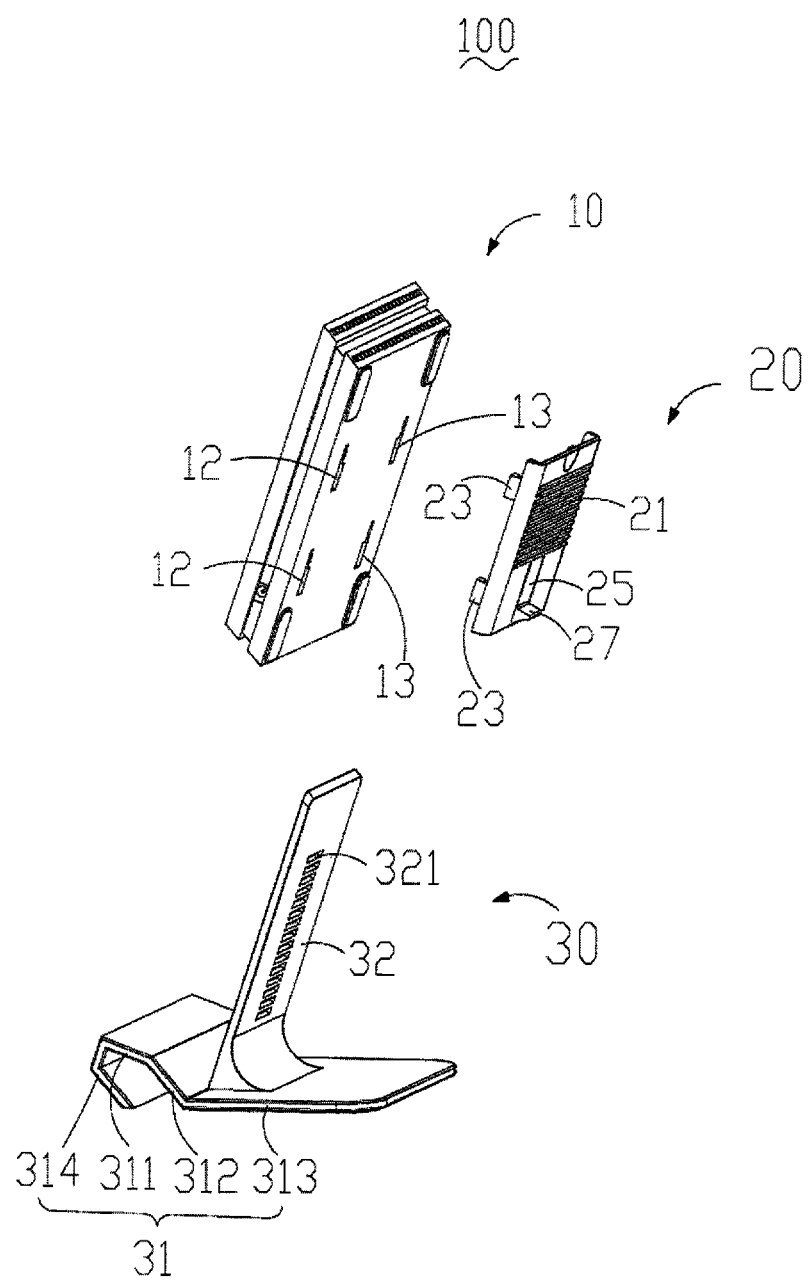
FIG. 4 is an exploded view of the wireless charging device of FIG. 3.

With reference to FIGS. 4-5, in the first embodiment, the positioning seat 20 further includes an operating strip 25, and a pair of gaps 28 are defined between the two side of the operating strip 25 and the first positioning board 21. The operating strip 25 includes an operating portion 27, and the latching strip 26 and the operating portion 27 are located at two sides of the operating strip 25, respectively. The gaps 28 are positioned to enhance elasticity of the operating strip 25. When the position of the wireless charger 10 is required to be adjusted, an operator is only required to apply force on the operation portion 27 to result the latching strip 26 to escape from one of the positioning slots 321 of the adjusting board 32. When the adjusting operation is finished, the operator is only required to escape from the operating portion 27. Subsequently, the latching strip 26 on the operating strip 25 is latched into one of the positioning slots 321 of the adjusting board 32 to fix the wireless charger 10 with the adjusting board 32. The operating structure described above is simple and convenient, and is a saver of time and strength, which results of convenience for the consumers.

FIGS. 7-11 show the wireless charging device 100 according to a second exemplary embodiment of the disclosure. In the second embodiment, the wireless charging device 100 is mainly used in a vehicle, such as cars and buses. The wireless charging device 100 is hung on a supporting wall of the vehicle.

With reference to FIGS. 12-16, in the second embodiment, the positioning seat 20 further includes a second positioning board 29. Two sides of the second positioning board 29 connect with two sides of the first positioning board 21, respectively to collectively form a sliding slot 50. The wireless charging device 100 further includes a first clamping board 60, a second clamping board 70, a first positioning block 1, a second positioning block 2 and a sliding block 3. The sliding block 3 is fixed with the first positioning board 21. One end of the first clamping board 60 inserts into the sliding slot 50 from one end of the sliding slot 50, and one end of the second clamping board 70 inserts into the sliding slot 50 from another end of the sliding slot 50. The first clamping board 60 and the second clamping board 70 slide along the sliding slot 50, respectively, to adjust distance between another ends of the first clamping board 60 and the second clamping board 70. The electronic device is clamped between the other ends of the first clamping board 60 and the second clamping board 70.

Figure 16:
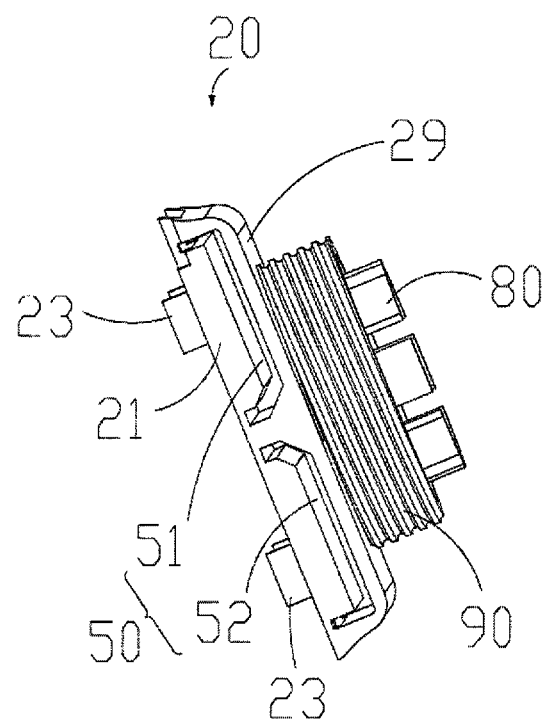
FIG. 16 is a perspective view of the positioning seat of FIG. 14.

In detail, the sliding slot 50 includes a first child sliding slot 51 and a second child sliding slot 52 parallel to the first child sliding slot 51, shown as FIG. 16. The first clamping board 60 comprises a first clamping portion 61, a first sliding strip 62 and a second sliding strip 63. The first and second sliding strips 62, 63 extend from the first clamping portion 61. The second sliding strip 63 defines a plurality of first recesses 631. The second positioning board 29 defines a first latching slot 291 in communication with the second child sliding slot 52, shown as FIG. 14.

The second clamping board 70 includes a second clamping portion 71, a third sliding strip 72, and a fourth sliding strip 73. The third and fourth sliding strips 72, 73 extend from the second clamping portion 71. The third siding strip 72 defines a plurality of second recesses 721, and the second positioning board 29 defines a second latching slot 293 in communication with the first child sliding slot 51, shown as FIG. 14.

In assembly, the first sliding strip 62 and the second sliding strip 63 extend into the first child sliding slot 51 and the second child sliding slot 52, respectively, and slide along the first child sliding slot 51 and the second child sliding slot 52, respectively. The first clamping portion 61 exposes out of the sliding slot 50. The third sliding strip 72 and the fourth sliding strip 73 extend into the first child sliding slot 51 and the second child sliding slot 52, respectively, and slide along the first child sliding slot 51 and the second child sliding slot 52, respectively. The second clamping portion 71 exposes out of the sliding slot 50. The first positioning block 1 is positioned at the first latching slot 291, and extends into the second child sliding slot 52 to engage with one of the first recesses 631 of the second sliding strip 63 to adjust a distance between the first clamping portion 61 of the first clamping board 60 and the first positioning board 21. The second positioning block 2 is positioned at the second latching slot 293, and extends into the first sliding slot 51 to engage with one of the second recesses 721 of the third sliding strip 72 to adjust a distance between the second clamping portion 71 of the second clamping board 70 and the first board 21, shown as FIG. 13 and FIG. 14.

In the second embodiment, the adjusting board 32 of the adjusting seat 30 defines a sliding groove 322. The sliding block 3 is fixed with the first positioning board 21. The first positioning board 21 defines a hollow portion 41, shown as FIG. 15. In assembly, the wireless charger 10 is fixed with the positioning seat 20 to cover the hollow portion 41 to form the sliding space 40. The sliding block 3 slides along the sliding groove 322 to adjust the location of the transmitter coil center 11 of the wireless charger 10.

In use, the first clamping board 60 and the second clamping board 70 is pulled, and the electronic device is positioned at the first supporting portion 311 of the supporting board 31 with the back of the electronic device against the wireless charger 10, and the center position of the electronic device and the transmitter coil center 11 of the wireless charger 10 being in the same line. The first clamping board 60 and the second clamping board 70 slide along the sliding slot 50 to clamp the electronic device between the first clamping portion 61 of the first clamping board 60 and the second clamping portion 71 of the second clamping board 70. The adjusting board 32 slides to result the transmitter coil center 11 of the wireless charger 10 to align the center position of the electronic device.

It follows that, the first clamping board 60, the second clamping board 70 and the adjusting seat 30 of the wireless charging device 100 of the second embodiment are capable of stretching out and drawing back, separately, to meet the wireless battery charging requirement of different electronic devices with different sizes, which results convenience for the consumers.

In the second embodiment, the second sliding strip 63 defines a first concave 632, and the third sliding strip 72 defines a second concave 722. In assembly, the first sliding strip 62 extends into the first child sliding slot 51 and slides on a surface of the second concave 722. The fourth sliding strip 73 extends into the second sliding slot 52 and slides on a surface of the first concave 632. The first and second concave 632, 722 is positioned so as to reduce the size of the sliding space 50, which results of small size of the whole wireless charging device 100.

Because the wireless charging device 100 of the second embodiment is generally used in the vehicle, the positioning seat 20 further includes a plurality of clamping sheets 80 projecting from the second positioning board 29, and a sleeve 90 projecting from the second positioning board 29. The clamping sheets 80 forms a shape of a circle, and the sleeve 90 surrounds the clamping sheets 80.

Correspondingly, the wireless charging device 100 further includes a supporting mechanism 9 supporting the wireless charger 10. One end of the supporting mechanism 9 extends into the clamping sheets 80 and fixes with the second positioning board 29 by engagement between a fixing part 4 and the sleeve 90.

In the second embodiment, the supporting mechanism 9 includes a spherical joint 5 extends into the clamping sheets 80 and stops at the fixing part 4. The spherical joint 5 latches with the second positioning board 29 with rotation of the fixing part 4. The spherical joint 5 is positioned so as to rotate the wireless charger 10 at any direction to adjust a supporting angle of the wireless charger 10.

In detail, the supporting mechanism 9 includes a connecting board 6, a pair of supporting arms 7, and a pair of latching arms 8. The spherical joint 5 projects from one side of the connecting board 6, and the pair of supporting arms 7 respectively extends from the connecting board 6 and locate symmetrically at two ends of the connecting board 6. The pair of supporting arms 7 resist the supporting wall to support the wireless charger 10. The pair of latching arms 8 parallel extends from another side of the connecting board 6 to latch with the supporting wall, respectively. In the embodiment, the pair of latching arms 8 latch with an air outlet of an air conditioner in the vehicle.

Figure 17:
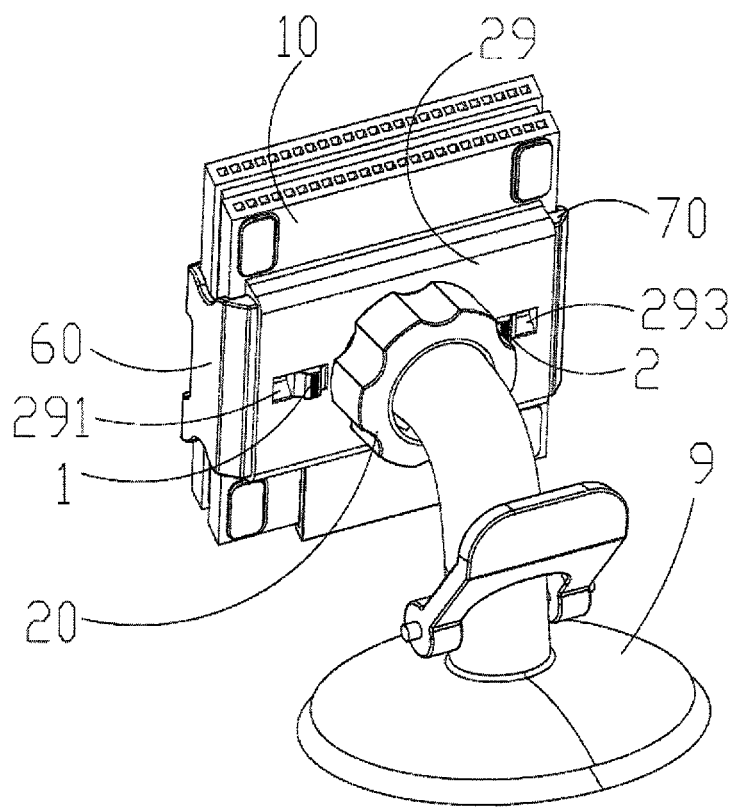
FIG. 17 is an assembled view of the wireless charging device according to a third exemplary embodiment of the disclosure.

FIG. 17 shows the wireless charging device 100 according to a third exemplary embodiment of the disclosure. The structure of the wireless charging device 100 of the third embodiment is substantially same as that of the wireless charging device 100 of the second embodiment, only differs that, the supporting mechanism 9 is a sucker. One end of the sucker is latched in the latching sheets 80 and fixed with the second positioning board 29 by the fixing part 4, and another end of the sucker adsorbs on the supporting wall to support the wireless charger 10. In the embodiment, the sucker can adsorbs on platforms of meters in the vehicle, or glass of the vehicle, which results of convenience for wireless battery charging.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A wireless charging device used for carrying out wireless battery charging for an electronic device, the wireless charging device comprising: a wireless charger; a positioning seat fixed with the wireless charger, wherein the positioning seat and the wireless charger collectively form a sliding space; and an adjusting seat supporting the electronic device; wherein the adjusting seat extends into the sliding space and slides along the sliding space relatively to the positioning seat, to adjust a location of a transmitter coil center of the wireless charger, which results that the transmitter coil center of the transmitter of the wireless charger aligns to a receptor coil center of the electronic device;

wherein the wireless charger comprises at least one first latching, portion and at least one second latching portion, the positioning seat comprises a first positioning board, at least one first hook, and at least one second hook, the first hook and the second hook project from the first positioning board, and wherein the sliding space is formed between the first positioning board and the wireless charger, the first hook engages with the first latching portion, and the second hook engages with the second latching portion to fix the wireless charger with the positioning seat.

2. The wireless charging device of claim 1, wherein the first latching portion defines a guiding slot, and comprises a first latching block extending from one side of the guiding slot, a stopping space is formed between the first latching block and a bottom of the guiding slot, wherein the first hook comprises a second latching block projecting from the first positioning board and a stopping block extending from the second latching block and parallel with the first positioning board, and wherein the first hook extends into the guiding slot and slides along the guiding slot, the stopping block slides into the stopping space and stops at the first latching block, and the first latching block and the second latching block mesh with each other to fix the wireless charger with the first positioning board.

3. The wireless charging device of claim 2, wherein the first latching portion and the second latching portion are axisymmetric.

4. The wireless charging device of claim 2, wherein the adjusting seat comprises a supporting board supporting the electronic device, and an adjusting board connected with the supporting board, wherein the adjusting board extends into the sliding space and slides in the sliding space to adjust the location of the transmitter coil center of the wireless charger.

5. The wireless charging device of claim 4, wherein the supporting board comprises a first supporting portion supporting the electronic device, and a slanting portion extending from one side of the first supporting portion slantly, and the adjusting board extends from the slanting portion and parallel with the wireless charger, and wherein a bottom of the wireless charger contacts the slanting portion.

6. The wireless charging device of claim 5, wherein the supporting board further comprises a second supporting portion and a third supporting portion, the second supporting portion extends from one side of the slanting portion, the third supporting portion extends from another side of the first supporting portion and toward the second supporting portion, and wherein the second supporting portion and the third supporting portion collectively support the wireless charger.

7. The wireless charging device of claim 6, wherein the positioning seat further comprises a pair of ribs extending from two sides of the first positioning board, respectively, the first hook and the second hook project from the pair of ribs, respectively, the pair of ribs resist the wireless charger, and wherein the pair of ribs, the first positioning board, and the wireless charger collectively form the sliding space.

8. The wireless charging device of claim 7, wherein the adjusting board defines a plurality of positioning slots, a latching strip projects from one side of the first positioning board toward the sliding space, and wherein the latching strip engages with one of the positioning slots to adjust a location of the wireless charger relative to the supporting board.

9. The wireless charging device of claim 8, wherein the positioning seat further comprises an operating strip, a pair of gaps are defined between the two side of the operating strip and the first positioning board, and the operating strip comprises a operating portion, the latching strip and the operating portion are located at two sides of the operating strip, respectively.

10. The wireless charging device of claim 5, wherein the adjusting board defines a sliding groove, the wireless charging device further comprises a sliding block fixed with the first positioning board, and wherein the sliding block slides along the sliding groove to adjust the location of the transmitter coil center of the wireless charger.

11. The wireless charging device of claim 10, wherein the positioning seat further comprises a second positioning board, two sides of the second positioning board connect with two sides of the first positioning board, respectively to collectively form a sliding slot, and wherein the wireless charging device further comprises a first clamping board and a second clamping board, one end of the first clamping board inserts into the sliding slot from one end of the sliding slot, and one end of the second clamping board inserts into the sliding slot from another end of the sliding slot, and wherein the first clamping board and the second clamping board slide along the sliding slot, respectively, to adjust distance between another ends of the first clamping board and the second clamping board, and wherein the electronic device are clamped between the other ends of the first clamping board and the second clamping board.

12. The wireless charging device of claim 11, wherein the sliding slot comprises a first child sliding slot and a second child sliding slot parallel to the first child sliding slot, and the first clamping board comprises a first clamping portion, a first sliding strip and a second sliding strip, the first and second sliding strips extend from the first clamping portion and slide in the first child sliding slot and the second child sliding slot, respectively, the first clamping portion exposes out of the sliding slot.

13. The wireless charging device of claim 12, wherein the second sliding strip defines a plurality of first recesses, the second positioning board defines a first latching slot in communication with the second child sliding slot, and wherein the wireless charging device further comprises a first positioning block, the first positioning block is positioned at the first latching slot with one end of the first positioning block extending into the second child sliding slot to engage with one of the first recesses to adjust a distance between the first clamping portion of the first clamping board and the first positioning board.

14. The wireless charging device of claim 13, wherein the second clamping board comprises a second clamping portion, a third sliding strip, and a fourth sliding strip, the third and fourth sliding strips extend from the second clamping portion, and slides in the first child sliding slot and the second child sliding slot, respectively, and wherein the second clamping board exposes out of the sliding slot.

15. The wireless charging device of claim 14, wherein the third sliding strip defines a plurality of second recesses, the second positioning board defines a second latching slot in communication with the first child sliding slot, and wherein the wireless charging device further comprises a second positioning block, the second positioning block is positioned at the second latching slot with one end of the second positioning block extending into the first child sliding slot to engage with one of the second recesses to adjust a distance between the second clamping portion of the second clamping board and the first positioning board.

16. The wireless charging device of claim 11, wherein the positioning seat further comprises a plurality of clamping sheets projecting from the second positioning board, and a sleeve projecting from the second positioning board, and wherein the clamping sheets forms a shape of a circle, and the sleeve surrounds the clamping sheets, and wherein the wireless charging device further comprises a supporting mechanism, and one end of the supporting mechanism extends into the clamping sheets and fixes with the second positioning board by engagement between a fixing part and the sleeve.

17. The wireless charging device of claim 16, wherein the supporting mechanism comprises a spherical joint extends into the clamping sheets and stops at the fixing part, the spherical joint latches with the second positioning board with rotation of the fixing part.

18. The wireless charging device of claim 17, wherein the supporting mechanism comprises a connecting board, a pair of supporting arms, and a pair of latching arms, the spherical joint projects from one side of the connecting board, the pair of supporting arms respectively extends from the connecting board and locate symmetrically at two ends of the connecting board, and the pair of latching arms respectively parallel extends from another side of the connecting board.

19. The wireless charging device of claim 16, wherein the supporting mechanism is a sucker.

* * * * *